United States Patent
Belz et al.

(10) Patent No.: US 10,118,465 B2
(45) Date of Patent: Nov. 6, 2018

(54) MOTOR VEHICLE INCLUDING A VENTILATION DEVICE FOR SUPPLYING AIR INTO THE INTERIOR OF THE VEHICLE

(71) Applicant: AUDI AG, Ingolstadt (DE)

(72) Inventors: Karsten Belz, Ingolstadt (DE); Georg Techel, Dresden (DE); Falko Radeke, Neufahrn (DE)

(73) Assignee: AUDI AG, Ingolstadt (DE)

(*) Notice: Subject to any disclaimer, the term of this patent is extended or adjusted under 35 U.S.C. 154(b) by 141 days.

(21) Appl. No.: 15/099,870

(22) Filed: Apr. 15, 2016

(65) Prior Publication Data

US 2016/0303949 A1   Oct. 20, 2016

(30) Foreign Application Priority Data

Apr. 16, 2015 (DE) .................. 10 2015 004 846

(51) Int. Cl.
| | | |
|---|---|---|
| *B60H 1/34* | (2006.01) | |
| *B60H 3/00* | (2006.01) | |
| *B60H 1/00* | (2006.01) | |

(52) U.S. Cl.
CPC ......... *B60H 3/0028* (2013.01); *B60H 1/0065* (2013.01); *B60H 1/00564* (2013.01); *B60H 1/00678* (2013.01); *B60H 1/3414* (2013.01); *B60H 1/3421* (2013.01); *B60H 2003/0042* (2013.01)

(58) Field of Classification Search
CPC ... B60H 3/0035; B60H 3/0028; B60H 3/0007
USPC ................ 454/152–156, 265–268, 277–283, 454/309–320
See application file for complete search history.

(56) References Cited

U.S. PATENT DOCUMENTS

2004/0067729 A1* 4/2004 Bourbon ............... B60H 1/34
    454/155
2016/0101668 A1* 4/2016 Doll ..................... F24F 13/072
    454/155

FOREIGN PATENT DOCUMENTS

| DE | 199 57 875 A1 | 11/2000 |
| DE | 202 12 778 U1 | 1/2003 |
| DE | 20 2004 006 316 U1 | 10/2005 |
| DE | 20 2005 009 940 U1 | 10/2005 |
| FR | 2 841 184 A1 | 12/2003 |

OTHER PUBLICATIONS

European Search Report dated Sep. 7, 2016 with respect to counterpart European patent application EP 16 00 0189.
Translation of European Search Report dated Sep. 7, 2016 with respect to counterpart European patent application EP 16 00 0189.

* cited by examiner

Primary Examiner — Vivek Shirsat
(74) Attorney, Agent, or Firm — Henry M. Feiereisen LLC

(57) ABSTRACT

A motor vehicle, includes a ventilation device for supplying air into the interior of the vehicle. The ventilation device includes at least one air outlet nozzle oriented toward an interior of the vehicle and is connected to a channel via which air is conductible to the air outlet nozzle. The air outlet nozzle has a first outlet region receiving the air supplied via the channel, and a second outlet region separate from the first outlet region, the second outlet region being connected with another channel for conducting a gaseous fragrance to the second outlet region.

9 Claims, 2 Drawing Sheets

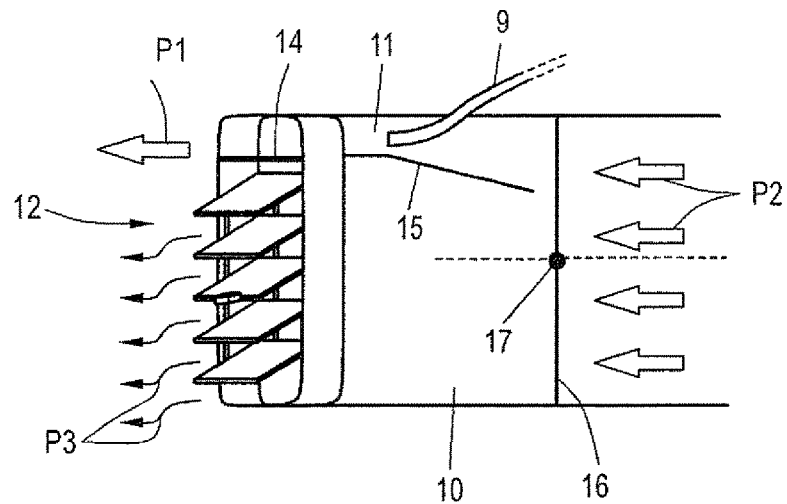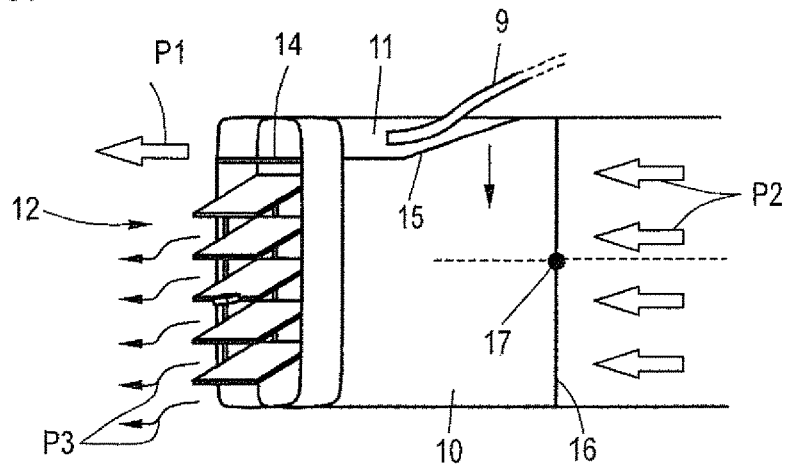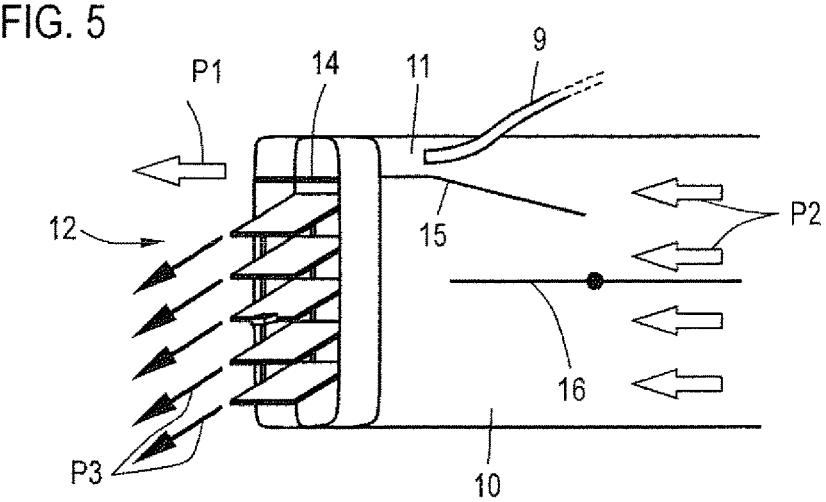

MOTOR VEHICLE INCLUDING A VENTILATION DEVICE FOR SUPPLYING AIR INTO THE INTERIOR OF THE VEHICLE

CROSS-REFERENCES TO RELATED APPLICATIONS

This application claims the priority of German Patent Application, Serial No. 10 2015 004 846.5, filed Apr. 16, 2015, pursuant to 35 U.S.C. 119(a)-(d), the content of which is incorporated herein by reference in its entirety as if fully set forth herein.

BACKGROUND OF THE INVENTION

The present invention relates to a motor vehicle including a ventilation device for conducting air into the interior of the vehicle.

The following discussion of related art is provided to assist the reader in understanding the advantages of the invention, and is not to be construed as an admission that this related art is prior art to this invention.

Modern motor vehicles enable very efficient ventilation of the vehicle interior, be it with fresh air or with air tempered by an air conditioning system. In the vehicle interior one or multiple air outlet nozzles are arranged, for example in the region of the dashboard, via which the driver or the passenger can adjust the inflow of air. Usually such an air outlet nozzle has a vane array, which can be manually adjusted to direct the airflow. In the interior of the air outlet nozzle usually a flap or the like is provided which can be opened and closed also by a manually operable actuating element in order to enable or prevent inflow of air.

In order to scent the interior of the vehicle it is known to arrange fragrance dispensers before the air outlet nozzle which emit, albeit in low amounts, a fragrance which is distributed in the interior of the vehicle via the air exiting the air outlet nozzle. This type of scenting of the interior is complicated and visually unappealing.

SUMMARY OF THE INVENTION

According to one aspect of the present invention, a motor vehicle, includes a ventilation device for supplying air into the interior of the vehicle. The ventilation device includes at least one air outlet nozzle oriented toward an interior of the vehicle and is connected to a channel via which air is conductible to the air outlet nozzle. The air outlet nozzle has a first outlet region receiving the air supplied via the channel, and a second outlet region separate from the first outlet region, the second outlet region being connected with another channel for conducting a gaseous fragrance to the second outlet region.

According to the invention the air outlet nozzle, which serves for ventilation of the vehicle, is also used for distributing a gaseous fragrance. For this purpose the air outlet nozzle is separated into two outlet regions. The first, preferably significantly greater, outlet region serves for conducting the incoming air into the vehicle interior. The second outlet region is provided for outflow of a gaseous fragrance. A channel leads into the second outlet region, via which channel a gaseous fragrance can be conducted from a fragrance source. When scenting is desired the fragrance flows into the vehicle interior via the second outlet region. A user can select the scenting for example by actuating a button, which causes activation of a fan or the like via which the fragrance is aspirated out of the fragrance source and is blown to the second outlet region via the channel.

Because the air outlet nozzle is arranged at a position optimized for ventilation of the interior, the fragrance can also be emitted at a site appropriate for efficient and uniform distribution. The air outlet nozzle is thus used multifunctionally.

The second outlet region is preferably not closable, i.e., no vane array or the like is arranged upstream of it via which the first outlet region can be closed or the outflow direction of the incoming air can be varied.

The first and the second outlet region can be separated from each other via a fixed wall element. This means that the air can only flow out via the first outlet region and the gaseous fragrance can only flow out via the second outlet region.

As an alternative the first and the second outlet region may also be separated from each other by a wall element in such a manner so that in a closed position of the wall element the outflowing air is only conducted to the first outlet region, while in an open state of the wall element the air is conducted to both outlet regions. This means that, depending on the position of the wall element, the air can either flow via the first outlet region or via the first and second outlet region. On the other hand the fragrance can only be supplied via the second outlet region. When the wall element is open the fragrance can be mixed with and entrained or distributed by the air flowing out of the second outlet region, i.e., the fragrance enriches the airflow.

Such a movable wall element is preferably pivotally supported and is adjustable via an operating element provided on a side of the air outlet nozzle facing the interior. Such an operating element can for example be a rotary wheel or lever or the like.

As described above usually a flap-shaped blocking element is provided via which the inflow cross-section for incoming air can be blocked. This means that the entire flow cross-section of the air outlet nozzle can be closed via this blocking element. According to the invention the arrangement is configured so that the gaseous fragrance can always be supplied independent of the position of the blocking element. This means that the airflow can be blocked but the gaseous fragrance stream can always be conducted into the vehicle interior via the second outlet region if desired by the user.

The channel via which the gaseous fragrance is conducted into the second outlet region is preferably implemented as a tube, which leads from the fragrance source to the second outlet region. The channel or the tube is of course arranged on the air outlet nozzle so that the supplied fragrance exclusively enters the interior of the nozzle and can be conducted into the vehicle interior.

According to another aspect of the invention an air outlet nozzle for a motor vehicle, is oriented toward an interior of the vehicle and is connected to a channel via which air is conductible to the air outlet nozzle, wherein the air outlet nozzle has a first outlet region receiving the air supplied via the channel and a second outlet region separate from the first outlet region, and wherein the second outlet region is connected with another channel for conducting a gaseous fragrance to the second outlet region.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 is a sectional view in from of a schematic representation through an air outlet nozzle according to the invention according to FIG. 2, FIG. 4 is a section view in from of a schematic representation of a second embodiment of an air outlet nozzle with a movable wall element, and FIG. 5 is a view according to FIG. 4 with a wall element in a second position.

DETAILED DESCRIPTION OF PREFERRED EMBODIMENTS

Figure 1:
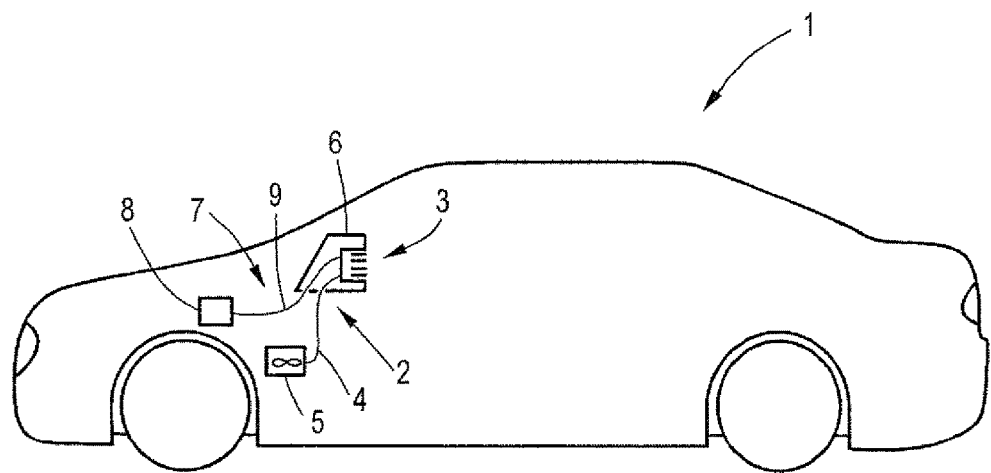
FIG. 1 is a schematic illustration of a motor vehicle according to the invention.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a motor vehicle 1 according to the invention including a ventilation device 2 for conducting air into the vehicle, The ventilation device 2 includes at least one air outlet nozzle 3 directed toward an interior of the vehicle, to which air outlet nozzle 3 air can be conducted via an air channel 4, for example using a fan 5. The fan 5 exemplifies an air conditioning system or the like as provided in a known manner in modern motor vehicles.

In the shown example the air outlet nozzle 3 is arranged at a dashboard 6, wherein usually multiple such air outlet nozzles are distributed over the width of the dashboard. In some cases, air outlet nozzles are also provided in the region of the B-column and in the rear compartment of the vehicle. These are together controlled via the common fan 5.

In each case it is possible to conduct air via the air outlet nozzle into the interior of the vehicle in a targeted manner, be it fresh air, or air tempered by the air conditioning system.

Further provided is a device 7 for supply of a gaseous fragrance into the interior of the vehicle. The device 7 includes a fragrance reservoir 8 downstream of which a not further shown delivery device in the form of a small fan or the like is arranged. Via a channel 9 the gaseous fragrance is also conducted to the air outlet nozzle 3. Via a not further shown operating element the fragrance supply can be activated or turned off, for example by closing or opening the channel 9 close to the fragrance reservoir 8 via the operating element, or by turning a supply device such as a fan associated to the channel 9 on or off.

Figure 2:
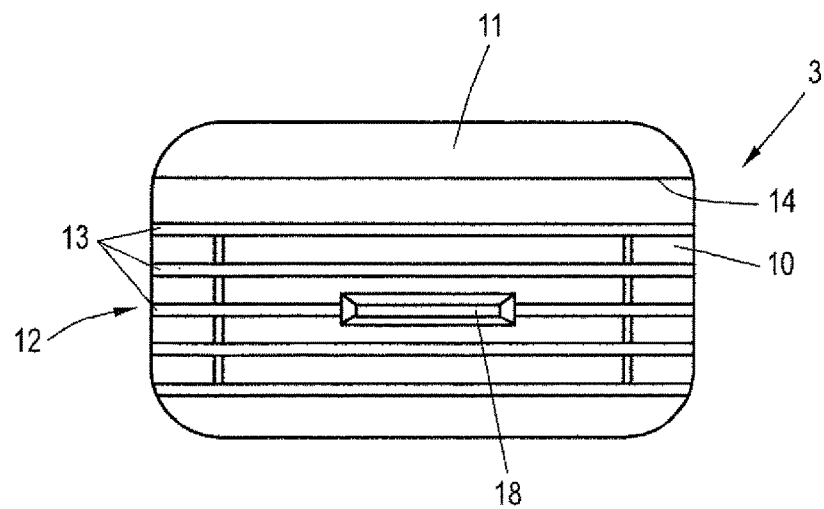
FIG. 2 is a front view of an air outlet nozzle according to the invention.

FIG. 2 shows a front view of the air outlet nozzle 3. The air outlet nozzle 3 includes two regions, i.e., a first outlet region 10, through which incoming air exits, and a second outlet region 11 to which the gaseous fragrance is supplied.

The first outlet region 10 is in the outflow cross section via a vane array 12 including a plurality of individual vanes 13 which are coupled by a common operating element 18 and are pivotal by the operating element about a horizontal axis and may be pivotal laterally. Via this the cross section of the outlet opening can be varied and the outflow direction adjusted.

The second outlet region 11 is separated from the first outlet region 10 via a fixed vane 14 and a wall element 15 arranged downstream of the vane 14.

In the exemplary embodiment according to FIG. 3, it is assumed that the wall element 15 is fixed, i.e., its orientation cannot be changed.

Leading into the second outlet region 11 is the channel 9 via which the gaseous fragrance can be supplied, which exits from the outlet region 11 into the interior of the vehicle as indicated by the arrow P1.

The incoming air is indicated by the arrows P2. In the shown exemplary embodiment a flap-shaped blocking element 16 is provided, which can be adjusted about a pivot axis 17 via a manually operable operating element for example a rotary wheel between a closed position, shown in solid lines, and an open position, shown in dashed lines. In the shown example the blocking element 16 is closed, i.e., the incoming air according to arrow P2 does not or at least not completely flow into the first outlet region 10. Therefore only a relatively small amount of air flows out of the vane array 12 as indicated by the arrows P3.

On the other hand the fragrance flows unimpeded, and with this independent of the position of the blocking element 16, into the second outlet region and reaches the interior of the vehicle.

Due to the fixed wall element a portion of the incoming air can also reach the second outflow region 11 when the blocking element 16 is opened. There the air is mixed with the supplied fragrance, which is then entrained by the airstream and reaches the interior of the vehicle.

FIGS. 4 and 5 show an embodiment, which substantially corresponds to the embodiment of FIG. 3 and therefore the same reference numerals have been used. Again a first outlet region 10 is provided and a second outlet region 11 into which a channel 9 leads. Also in this case a wall element 15 is provided, which continues the stationary vane 14. However in this case the wall element is movable and adjustable and can be adjusted between a closed position in which the second outlet region 112 is sealed and separated from the first outlet region 10, and an open position in which both regions are interconnected. For this a corresponding actuating element, for example also a rotary dial, can be provided.

In the position shown in FIG. 4 the blocking element 16 is again closed. The incoming air thus does not, or only to a minor degree, reach the first outlet region 10 and therefore only a small amount of air, see arrows P3, passes the vane array 12. On the other hand the fragrance can be conducted into the second outlet region 11 and released into the interior of the vehicle independent of the position of the blocking element 16.

FIG. 5 shows a position in which the wall element 15 is pivoted open. As can be seen it no longer rests sealingly against the housing topside of the air outlet nozzle 3. Since also the blocking element 16 is opened, sufficient amounts of incoming air, as indicated by arrows P2, reach the first outlet region 10 as well as the second outlet region 11 where it again can intermix with the supplied fragrance which is distributed into the interior of the vehicle via the air.

Because as indicated by arrow P2 the air can also enter the first outlet region unimpeded, a sufficient airflow also results through the vane array 12 as shown by arrows P3.

The air outlet nozzle is thus used multifunctionally. On one hand the interior of the vehicle can thus be ventilation via the air outlet nozzle, and on the other hand also the interior can be scented. The scenting can hereby be achieved regardless of whether a fixed wall element or a movable wall element is provided, always independent on whether air is blown via the air outlet nozzle into the interior or not.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A motor vehicle, comprising a ventilation device for supplying air into the interior of the vehicle, said ventilation device comprising at least one air outlet nozzle oriented toward an interior of the vehicle and being connected to a first channel via which air is conductible to the air outlet nozzle, said air outlet nozzle having a first outlet region receiving the air supplied via the first channel, and a second outlet region separate from the first outlet region, said second outlet region being connected with a second channel for conducting a gaseous fragrance to the second outlet region, wherein the second channel is constructed as a tube which extends from a fragrance reservoir located external to the air outlet nozzle into the second outlet region, wherein the first and second outlet are separated by a fixed vane and a movable wall element directly connected to the fixed vane, wherein the air is first directed by the movable wall element before being directed by the fixed vane.

2. The motor vehicle of claim 1, wherein in a closed position of the movable wall element inflowing air is only supplied to the first outlet region, and wherein in an open position of the movable wall element the inflowing air is supplied to the first and second outlet regions.

3. The motor vehicle of claim 2, wherein the movable wall element is supported pivotally.

4. The motor vehicle of claim 2 or 3, further comprising a manual operating element provided on a side of the air outlet nozzle which faces the interior for adjusting the wall element.

5. The motor vehicle of claim 3, further comprising a manual operating element provided on a side of the air outlet nozzle which faces the interior for adjusting the wall element.

6. The motor vehicle of claim 1, further comprising a flap-shaped blocking element adjustable by 90 degrees about a pivot axis and constructed for blocking an inflow cross section of the first channel upon orientation perpendicular to the air outlet nozzle, wherein the gaseous fragrance is conductible into the interior of the motor vehicle independent of a position of the blocking element.

7. An air outlet nozzle for a motor vehicle, said air outlet nozzle being oriented toward an interior of the vehicle and being connected to a first channel via which air is conductible to the air outlet nozzle, said air outlet nozzle having a first outlet region receiving the air supplied via the first channel and a second outlet region separate from the first outlet region, said second outlet region being connected with a second channel for conducting a gaseous fragrance to the second outlet region, said air outlet nozzle having flap-shaped blocking element adjustable by 90 degrees about a pivot axis and constructed for blocking an inflow cross section of the first channel upon orientation perpendicular to the air outlet nozzle, wherein the gaseous fragrance is conductible into the interior of the motor vehicle independent of a position of the blocking element, wherein the first and second outlet regions are separated from each other by a fixed vane and an adjustable wall element directly connected to the fixed vane, wherein the air is first directed by the adjustable wall element before being directed by the fixed vane.

8. The air outlet nozzle of claim 7, the wall element is supported pivotally.

9. The air outlet nozzle of claim 7, further comprising a manual operating element provided on a front side of the air outlet nozzle for adjusting the wall element.

* * * * *